United States Patent Office 3,469,592
Patented Sept. 30, 1969

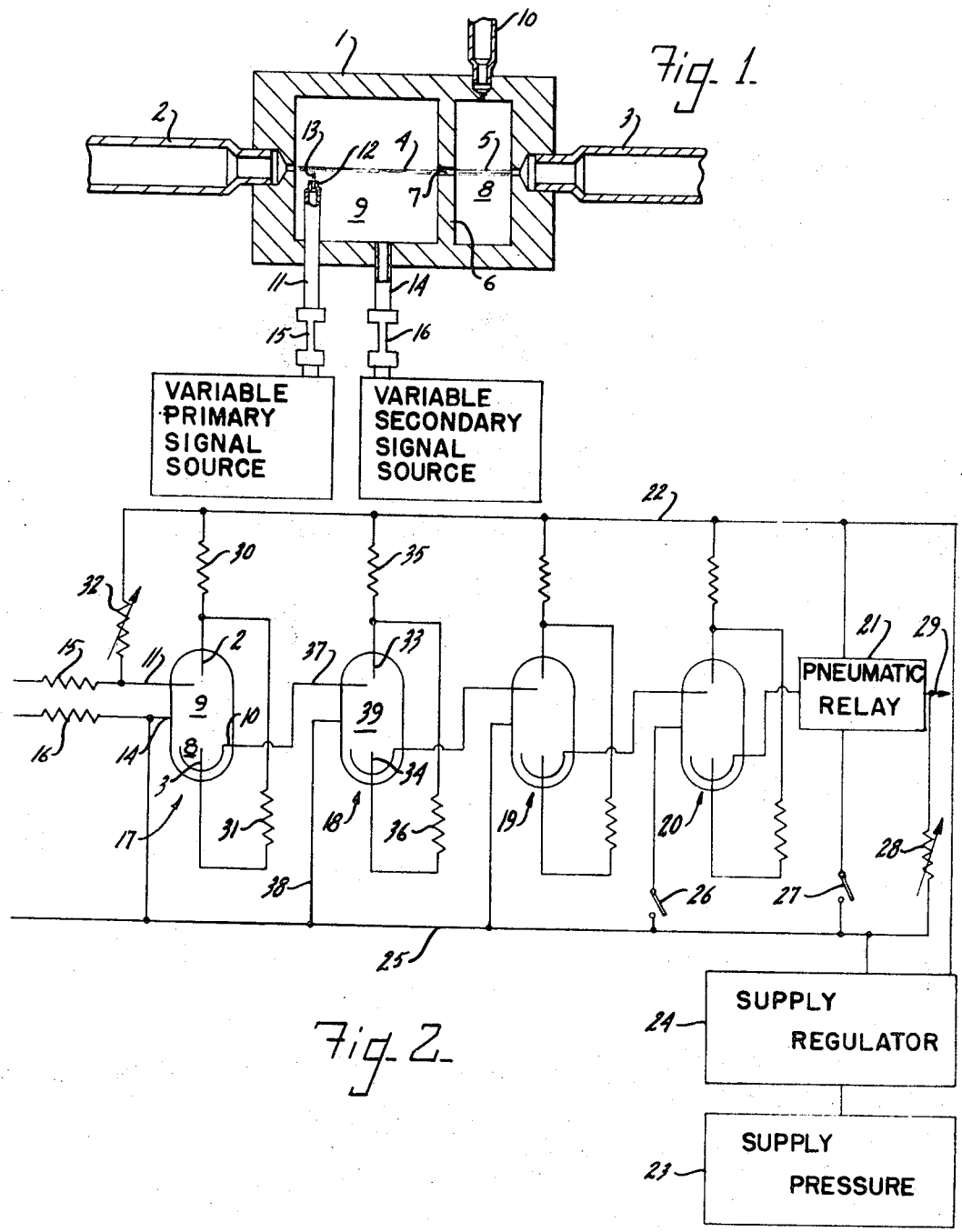

3,469,592
FLUID SIGNAL SUMMING MODULATOR AND
AMPLIFIER
Frank A. Kuczkowski, Glendale, and Richard N.
Laakaniemi, Milwaukee, Wis., assignors to Johnson Service Company, Milwaukee, Wis., a corporation of Wisconsin
Filed Dec. 27, 1965, Ser. No. 526,653
Int. Cl. F15c 1/10
U.S. Cl. 137—81.5                     16 Claims

ABSTRACT OF THE DISCLOSURE

The disclosure includes an impacting fluidic amplifier having a primary signal nozzle located normal to a main stream within a reference chamber. The nozzle establishes a deflecting signal stream. A secondary signal line terminates in the wall of the chamber for establishing a pressure in the reference chamber whereby a differential pressure across the orifice of the signal nozzle controls the deflection stream strength.

---

This invention relates to a fluid signal summing modulator and amplifier and particularly to improved means for summing two different fluid control pressures in a fluid control device.

In the recent development of fluid controls, an impacting stream device, more fully disclosed and described in the copending application of B. G. Bjornsen et al. entitled Fluid Control Apparatus which issued September 13, 1966, to Patent No. 3,252,546 has characteristics similar to that of electronic devices. Generally, in the impact modulator, a pair of opposing main streams is established with the impacting point located at a control orifice which defines an output chamber to one side thereof and a reference pressure chamber to the opposite side thereof. The impacting position with respect to such orifice is controlled by the relative strengths of the impacting streams.

An impact modulator may employ a transverse stream control wherein a perpendicularly related control stream engages the side of the main stream within the reference chamber to cause deflection of such main stream with respect to the opposing stream. This effectively modulates the strength of the controlled main stream with respect to the opposing stream and generates an output signal proportional to the input signal.

The present invention is particularly directed to establishing a deflection signal stream which is the summation of a variable primary signal pressure and a variable secondary signal pressure. In accordance with the present invention, the deflection signal stream is created within a reference chamber. The deflection signal stream is formed by a primary line terminating in a signal orifice within the reference chamber and a secondary line terminating in the reference chamber. The signal pressures of the primary line and the secondary line or reference chamber create a differential pressure across the one signal orifice which produces the deflection signal stream for controlling the position of the main stream.

The present invention is particularly directed to providing a new and novel connection and arrangement of a transverse impact modulator to permit summing of two control signals. Generally, in accordance with the present invention, the one control signal is applied to a signal orifice in the usual manner and the second control signal is connected directly to the reference chamber. The two signals generate a differential pressure which is applied across the signal orifice which in turn determines the signal stream which controls the deflection of the main stream in the manner heretofore described.

The relative signal line resistance controls the pressure gain characteristic with respect to each signal. Consequently, the pressure gain characteristics can be made equal or offset in any desired manner by control of the relative resistance of the signal lines. The present invention provides a fluid means of accurately sensing differential pressures over a wide range of signal levels. This results from the fact that the system can be set up to provide equal pressure gain with respect to each of the pressure signals and the differential pressure is applied across a single control or signal orifice.

In accordance with another very important aspect of the present invention, the novel summing modulator is connected as a part of an amplifying system and the several stages and the main supply pressure regulator for the associated stages are referenced to the secondary signal pressure of the summing modulator. The referencing system maintains a constant supply pressure with respect to the reference and further avoids changes in the relative reference pressures of the several stages with changes in the signal pressure. By referencing the summing transverse impact modulator with the subsequent fluid amplifier stages, the system eliminates the effect of the normal relative changes in the reference pressure of the several stages.

Feedback pressure and flow to either of the signal channels can be provided to produce positive or negative feedback and thus provide a very versatile fluid device.

The drawing furnished herewith illustrates a preferred construction of the present invention in which the above advantages and features as well as others will be clear from the following description.

In the drawing:

FIG. 1 is a diagrammatic view of a fluid modulator constructed in accordance with the present invention; and FIG. 2 is a schematic circuit diagram illustrating a fluid amplifier system incorporating the impact modulator of the present invention.

Referring to the drawing and particularly to FIG. 1, a summing transverse impact modulator is diagrammatically shown. Generally, the impact modulator includes a body or enclosure 1 having a pair of opposed and spaced main stream nozzles 2 and 3 in the opposite end walls of the enclosure. The nozzles 2 and 3 have selected orifices to define a pair of similar opposed flowing streams 4 and 5. A control orifice wall 6 extends transversely within the enclosure 1 and includes a control orifice 7 aligned with and spaced from the orifices of the main stream nozzles 2 and 3. The control wall defines a collector or output chamber 8 to one side thereof shown adjacent the main stream nozzle 3 and a reference chamber 9 to the opposite side thereof.

As more fully developed in the previously identified patent, the opposing streams 4 and 5 create an impacting balance position dependent upon the relative strength of the two streams. Generally, the balance occurs within or at control orifice 7 and creates an output signal in chamber 8 which is proportional to the relative strength of the stream pressures. An output connection 10 is made to the output chamber 8 to sense the position of the impacting streams. The reference chamber 9 is closed and includes a primary control signal line 11 terminating in a control orifice 12 within the reference chamber 9 and adjacent the main stream nozzle 2 for establishing a control stream 13 at right angles to the main stream 4 emitted from nozzle 2. The control signal stream 13 deflects the main stream 4 with respect to the control orifice 7 and thereby varies the effective strength of the stream 4 relative to stream 5. The impact position of streams 4 and 5 with respect to the control orifice 7 varies accordingly to correspondingly change the pressure signal in the output chamber 8 referenced to the reference pressure in the reference chamber 9.

In accordance with the present invention, a secondary pressure signal line 14 is connected to the reference chamber 9. A secondary pressure or flow signal which is to be summed with the primary signal pressure is applied to line 14.

The signal pressures of the primary line and the secondary line or reference chamber produce a differential pressure across the signal orifice 12. If the signals were applied directly across the orifice 12, the gain characteristic, the change in output signal for a given change in input signal, is the same for the two input signals. However, as a practical matter, the variable signal sources must necessarily be connected by signal lines and it has been found that the relative gain characteristic is dependent upon the resistance of the signal lines.

In the illustrated embodiment of the invention, suitable restrictors 15 and 16 are shown inserted into the signal lines 11 and 14 and are selected to control the gain characteristic. Generally, the restrictors 15 and 16 will be selected to provide equal resistance or opposition to flow such that the output pressure, referenced to the low signal pressure, responds or varies in the same manner to a change in one control signal as to an equal and opposite change in the other control signal. Applicants have thus found that the pressure gain with respect to each of the signal lines is controlled by the resistance inserted in the line and in particular as defined by the equation:

$$\frac{\text{gain primary signal}}{\text{gain secondary signal}} = -\left(\frac{\text{resistance secondary line}}{\text{resistance primary line}}\right)^2$$

Therefore by maintaining equal resistance in the lines of the two control signals, equal pressure gain with respect to each pressure signal is provided.

The differential pressure exists across the single control orifice of the primary signal nozzle and consequently accurate sensing of differential pressures over a wide range of signal levels can be obtained. Further, where equal pressure gain with respect to each pressure signal is provided, the accuracy of sensing of the differential pressures will be increased.

In the operation of the device, the primary signal pressure and the secondary signal pressure, which may be a single pressure or a summation of a plurality of pressures, are applied to the respective signal lines. This generates a pressure differential across the control signal orifice with a resulting signal stream from the control nozzle which modulates the transverse impacting stream in accordance with the usual principles of deflection. The device in addition to providing equalized gain and being relatively insensitive to signal pressure levels also provides amplification.

Although restrictors 15 and 16 are shown as separate elements, the resistance may be only that of the signal lines.

Referring particularly to FIG. 2, a summing transverse impact modulator is connected in a multiple stage fluid amplifier having the several stages shown schematically by line representation.

Referring particularly to FIG. 2, the illustrated amplifier generally includes a summing transverse impact modulator 17 as the input stage, three transverse impact modulators 18, 19 and 20 as successive amplifying stages and a pneumatic relay 21 as a final power stage. The impact modulators 18–20 generally correspond to the summing modulator 17.

A main supply pressure line 22 is connected to the several modulators 17–20 to establish the main streams. Line 22 is connected to a suitable source 23 through a supply pressure regulator 24. The modulators 18 and 19 of the first two amplifying stages and the supply regulator 24 are connected by a reference line 25 to the secondary signal pressure line 14 of the summing modulator 17 and therefore are referenced to the same reference as the summing transverse impact modulator 17. The final stage modulator 20 of the amplifying stages and the pneumatic relay 21 are similarly and selectively connected by suitable flow switching means 26 and 27 to the secondary signal pressure reference line 25 or to atmosphere.

An adjustable feedback restrictor 28 is shown connected between the reference line 25 and the output line 29 of the amplifier to provide a feedback signal to the secondary signal pressure.

Generally, in the operation of the device, the supply pressure regulator 24 provides a predetermined balance point in each of the impact modulators including the summing transverse impact modulator 17. The variable primary control signal pressure and the variable secondary control signal pressure are applied across the control orifice of line 11 of modulator 17 to establish a correspondingly varying control stream dependent upon the pressure differential of the two control signals. The varying control stream deflects the main stream from nozzle 2 with respect to the output orifice 7 and therefore the opposing stream from nozzle 3. The output signal successively amplified by the succeeding transverse impact modulator 18–20 and the pneumatic relay 21 to provide a control signal at line 28 is suitable for operating a load. A portion of the output signal, as determined by the setting of the variable fluid resistor 28 is fed back to the reference line 25 and therefore modifies the secondary pressure signal and improves the operational characteristic of the amplifier.

More particularly in the illustrated embodiment of the invention, the summing transverse impact modulator 17 has its main nozzles 2 and 3 connected to the supply pressure line 22 through a common restrictor or fluid resistor 30. An additional resistor 31 is connected between nozzle 3 and resistor 30. The resistors in the several lines are selected to provide a predetermined balanced position in the summing transverse impact modulator in the absence of control signals at either the primary signal line 11 or the secondary signal line 14.

The supply line 22 is also connected though a variable restrictor 32 to the primary signal pressure line 11 to the outlet side of the primary line signal restrictor 15. The primary signal pressure may be biased to a desired level and the variable primary signal can be higher or lower than the secondary signal pressure of line 14. The bias also permits creation of outward flow of air or other operating fluid in the signal lines and thus permits sensing of fluid signals which contain contaminants.

As previously noted, the secondary pressure control signal line 14 is connected directly by the reference pressure line 25 to the supply pressure regulator 23 and consequently the regulator 24 and the supply to the several stages are referenced to a corresponding pressure and variations in the secondary signal pressure will not change the characteristic of the amplifier.

The first amplifying stage is shown as a transverse impact modulator 18 having the opposed stream nozzles 33 and 34 similarly connected to the main supply pressure line 22 through suitable restrictors 35 and 36. The transverse control nozzle 37 is connected to the output connection 10 of the summing transverse impact modulator 17. A reference line 38 connects the reference chamber 39 of the modulator to the reference pressure line 25. The modulator 18 amplifies the output signal of the summing modulator 17 generally in accordance with the theory heretofore given for an impact modulator and the signal is further amplified by modulator 19 which is connected to the supply line 22 and reference line 25 in the same manner as modulator 18. The modulators 18 and 19 are referenced to the secondary signal pressure through line 25 and provide improved stability of operation.

Thus, the output signal of the modulator 17 is referenced to the secondary signal pressure in the reference chamber 9 and is a difference signal. If the signal level changes without a differential change, the output signal remains the same, referenced to the secondary signal pressure, but its absolute value changes. This is of substantial significance in the first amplifying stages where the signal levels are relatively small. Further, any variation is amplified by the first stage and results in an increased error in the output. The referencing system thus eliminates any relative change in the amplifier characteristics as a result of relative changes in the referencing pressures.

The third stage of the amplifier is an amplifying modulator 20 similarly connected to further amplify the output signal from modulator 19 and raise to a level suitable for operating pneumatic relay 21. In the modulator 20 however the reference chamber is selectively connected to ground; i.e. atmosphere, or to the reference pressure line 25. The final fluid amplifying stage is a relatively high pressure stage and consequently the effect of changes in local ambient or atmosphere have a correspondingly smaller effect on the output signal. Therefore where the feedback effect from the reference chamber to the input might cause instability of operation, the modulator 20 is referenced to atmosphere where exact results are desired and only small signal changes are sensed, the modulator 20 would also be referenced to the secondary signal pressure by closing of fluid switch 26.

The amplified signal from modulator 20 is impressed on the pneumatic relay 21 which may be of any well known type having means to vary the connection of supply line 22 to the output line 29. The pneumatic relay 21 is also selectively referenced to atmosphere or to the secondary signal pressure in accordance with the degree of control desired, the magnitude of the control signal difference and the like. The relay 21 substantially increases the pressure level and available flow and further provides an on-off type control to minimize air consumption when the output is zero.

The illustrated fluid amplifier of this invention therefore employs a modified transverse impact modulator as a summing modulator 17 and a referencing system for at least the initial amplifying stages 18 and 19 and the supply pressure regulator 24. As a result of the referencing system any variation in the referencing pressure is equally applied to all of the related stages and to the supply pressure regulator. This is highly desirable in order to prevent a relative change in signal seen by the first amplifying stage with a change in the signal pressure level of the summing transverse impact modulator. The supply pressure regulator maintains a constant supply pressure to the several stages with respect to the reference pressure in order to maintain constant modulator performance and characteristics which can be accurately predicted.

As previously briefly noted, the gain of the summing transverse impact modulator is directly related to the signal line resistance. Consequently, by proper selection of signal line resistance shown as including restrictors 15 and 16, the ratio of the pressure gain with respect to each line can be made equal. On the other hand, if it is desired for some reason or other to have unequal gains, this can be directly inserted or obtained by insertion of correspondingly related unequal restrictors in the one signal line or the other.

The feedback pressure and flow, in the illustrated embodiment of the invention, is added to the secondary signal line 14 to provide negative feedback and thereby provide a negative gain amplifier. If positive feedback is desired of course an additional amplifying stage may be inserted into the overall amplifier, or the feedback pressure and flow can be added to the primary line 11.

In certain instances where a substantial amount of feedback is desired, additional restrictors or resistance are preferably added in the signal lines in order to conserve or reduce the air supply requirement. This requires that corresponding amounts of resistance be introduced into all signal lines in order to maintain the equalized pressure gain as noted in the above equation. Although this will reduce the gain of the instrument, it is completely consistent with and satisfactory for negative feedback amplifiers where the requirement for substantial amounts of feedback would normally be encountered.

The action of the summing modulator 17 and the amplifier can be reversed by interchanging the connection of the signal pressures to lines 11 and 14, with the appropriate adjustment of the bias resistor 32 to maintain the pressure of the line 11 greater than that of line 14.

The present invention thus provides an improved apparatus for summing signal pressures over a substantial range of signal levels and for amplifying the summed signals.

We claim:
1. A fluid signal summing apparatus, comprising
a fluid device having an enclosure including a reference chamber with a main stream orifice for emitting a main stream and a substantially opposed output control orifice to receive said main stream,
a primary control signal line terminating in a signal orifice in the reference chamber in lateral spaced relation to the path of the main stream and defining a deflection signal stream engaging the spaced main stream, and deflecting said main stream from the path established by the main stream orifice,
a secondary non-deflecting control signal line terminating in connection to the reference chamber and establishing a related pressure within the reference chamber and establishing a differential pressure across the signal orifice and thereby conjointly controlling the strength of said deflection signal stream in accordance with the signal pressure of said signal lines, and
a pair of variable control signal sources connected to said respective signal lines.

2. The fluid signal summing apparatus of claim 1 having the resistance of said signal lines selected to provide a preselected gain characteristic in accordance with the equation:

$$\frac{\text{gain primary signal}}{\text{gain secondary signal}} = -\left(\frac{\text{resistance secondary line}}{\text{resistance primary line}}\right)^2$$

3. The summing appartus of claim 1 wherein said signal lines have equal resistances to establish equal pressure gain with respect to each signal pressure.

4. The summing appartus of claim 1 having a fluid amplifier device connected to receive the output signal from the output control orifice and having a reference chamber connected to the reference chamber of the fluid device.

5. The summing apparatus of claim 1 having a supply pressure regulator connected to establish the main stream and a reference line connecting the reference chamber to the regulator to reference the supply pressure to pressure of the reference chamber.

6. The summing appartus of claim 1 having a supply pressure connection to the first signal line to bias the signal stream to a selected level and including an adjustable means to vary said level.

7. A fluid signal summing apparatus comprising
a transverse impact modulator having a pair of opposed nozzles for providing impacting main streams defining a balance impact position in operative relation to a control orifice, said control orifice defining an output chamber to one side thereof and a reference chamber to the opposite side thereof,
a primary signal line terminating in a signal orifice defining a deflection signal stream and connected to a first variable signal source, said orifice being located in the reference chamber to one side of one of said main streams whereby the signal stream engages the corresponding main stream and proportionately deflects the main stream from the path established by the corresponding nozzle, and
a secondary non-deflecting signal line connected to the reference chamber and to a second variable signal source to establish a related pressure within the chamber and a differential pressure across the signal orifice and establish the control signal stream dependent on the differential of the control signal pressures.

8. The summing apparatus of claim 7 wherein said signal lines have resistances selected to produce gain characteristics in accordance with the equation:

$$\frac{\text{gain primary signal}}{\text{gain secondary signal}} = -\left(\frac{\text{resistance secondary line}}{\text{resistance primary line}}\right)^2$$

9. The summing apparatus of claim 7 wherein said signal lines have equal resistances to establish equal pressure gain with respect to each signal pressure.

10. The summing apparatus of claim 7 having a fluid amplifier connected to the output chamber, said fluid amplifier having a reference chamber connected to the first reference chamber.

11. The summing appartus of claim 7 having a supply pressure regulator connected to the opposed nozzles and a reference line connected between the reference chamber and the regulator.

12. The summing apparatus of claim 7 having a feedback path connected between the output from said output chamber and one of said signal lines.

13. The summing apparatus of claim 7 having a plurality of successive amplifying transverse impact modulators connected between the output chamber and an output line to amplify the summed signal, a reference line connected to at least the first transverse impact modulator and the reference chamber, a supply pressure regulator connected to said opposed nozzles and to said transverse impact modulators and to the reference line.

14. The summing apparatus of claim 13 having the regulator connected to the first signal line to bias the signal stream to a selected level and including an adjustable means to vary said level.

15. The summing apparatus of claim 13 having a variable restrictor connected between the reference line and the output line to establish a feedback signal to the summing modulator.

16. The summing apparatus of claim 13 having a pneumatic relay connected to the output of the modulators and to the output line, said relay being selectively connected to the reference line.

References Cited
UNITED STATES PATENTS

| | | | |
|---|---|---|---|
| 2,919,712 | 1/1960 | Markey | 137—81.5 XR |
| 3,024,805 | 3/1962 | Horton | 137—81.5 |
| 3,174,497 | 3/1965 | Sowers | 137—81.5 |
| 3,207,168 | 9/1965 | Warren | 137—81.5 |
| 3,272,215 | 9/1966 | Bjornsen et al. | 137—81.5 |
| 3,285,263 | 11/1966 | Bjornsen et al. | 137—81.5 |
| 3,323,532 | 6/1967 | Campagnudo | 137—81.5 |

SAMUEL SCOTT, Primary Examiner